(12) United States Patent
Ristola

(10) Patent No.: US 6,352,383 B1
(45) Date of Patent: Mar. 5, 2002

(54) MOUNTING ADAPTER FOR MOUNTING A PROTECTOR TO A HELMET OR LIKE

(76) Inventor: Arimo Ristola, Kangaskatu 39, FIN-40630 Jyväskylä (FI)

( * ) Notice: Subject to any disclaimer, the term of this patent is extended or adjusted under 35 U.S.C. 154(b) by 0 days.

(21) Appl. No.: 09/426,515

(22) Filed: Oct. 26, 1999

(30) Foreign Application Priority Data

Dec. 11, 1998 (FI) .................................................. 982681

(51) Int. Cl.⁷ ................................................. A42B 1/24
(52) U.S. Cl. ........................ 403/254; 403/162; 403/397; 2/10; 2/422
(58) Field of Search .......................... 2/5, 6.3, 6.5, 6.7, 2/10, 422, 6.2; 403/116, 117, 162, 163, 254, 397

(56) References Cited

U.S. PATENT DOCUMENTS

| 3,259,006 | A | * | 7/1966 | Dukatz et al. | .......... 403/163 X |
| 3,727,235 | A | * | 4/1973 | Fisher | .......... 2/10 X |
| 4,100,619 | A | * | 7/1978 | Piech et al. | .......... 2/10 |
| 4,109,320 | A | * | 8/1978 | Anderson | .......... 2/10 |
| 4,766,609 | A | * | 8/1988 | Lane | .......... 2/5 |
| 5,052,054 | A | * | 10/1991 | Birum | .......... 2/10 |
| 5,291,880 | A | * | 3/1994 | Almovist et al. | .......... 2/10 X |
| 5,546,610 | A | * | 8/1996 | Herzig et al. | .......... 2/422 |
| 5,604,930 | A | * | 2/1997 | Petit et al. | .......... 2/6.5 |
| 5,658,065 | A | * | 8/1997 | Jamieson | .......... 2/6.2 |

* cited by examiner

Primary Examiner—Lynne H. Browne
Assistant Examiner—David E. Bochna
(74) Attorney, Agent, or Firm—Fildes & Outland, P.C.

(57) ABSTRACT

A fastening adapter for fastening protectors to a helmet or other headgear includes a body part, a housing connected to the body part, at least one fastening device of the body part adapted to be fitted through a hole arranged in a wall of the helmet, at least one fastening device locking device for locking the fastening device and for pressing the body part onto the wall, which fastening device includes rotation prevention devices, to prevent the body part from rotating in relation to the wall.

15 Claims, 6 Drawing Sheets

# MOUNTING ADAPTER FOR MOUNTING A PROTECTOR TO A HELMET OR LIKE

TECHNICAL FIELD

This invention relates to a fastening adapter for fastening a protector, such as a hearing protector (or eye/face protector), to a helmet or other headgear.

BACKGROUND OF THE INVENTION

Usually various kinds of protectors, such as hearing protectors, are used in connection with safety helmets made from plastic. In some (slotted) helmets, there are existing pre-fastening devices for fastening protectors. In such cases, the attachment of hearing protectors, for example, is relatively simple. However, the attachment of protectors to a general-purpose (non-slotted) helmet without pre-fastening devices is very much more difficult and indeed sometimes impossible.

In one known protector fastening adapter intended for a general-purpose helmet, the body part is fastened to the helmet with two bolts. For this purpose, two holes must be machined in the helmet. The body part fastened to the helmet is then set rotatably in a housing, to which the actual hearing protector is attached. The installation of the fastening adapter requires tools, due to the nuts and bolts, which makes the attachment more difficult. In addition, the nuts and the ends of the bolts protrude considerably inside the helmet. This can create a risk of injury to the user of the helmet, in the form of a bruising or an electrical shock. It is also difficult to position the holes by eye.

SUMMARY OF THE INVENTION

An object of the present invention is to create a simpler, more versatile, and easier to install fastening adapter for fastening protectors to a helmet or other headgear.

The present invention provides a fastening adapter for fastening protectors, such as hearing and/or face shield protectors, to a helmet or other headgear. The fastening adapter includes a body part to be attached to the helmet or headgear, and a housing connected to the body part and supporting the protector. At least one fastening device of the body part is fitted through a hole arranged in a wall of the helmet or headgear, and at least one fastening device locking device on the opposite side of the wall in relation to the body part for locking the fastening device and for pressing the body part onto the wall. The fastening device includes rotation prevention devices, to prevent body part from rotating in relation to the wall.

The fastening device is in two parts, both of which fastening devices are pins that extend through wall and which are set at a distance from each other. The first fastening device comprises a protrusion that forms part of body part and the second fastening device comprises an axle pin forming part of housing, which extends through both body part and wall, and to which axle pin locking device is intended to be fitted.

The fastening adapter includes a series of pairs of locking devices forming locks for different wall thicknesses. The series forming part of the fastening adapter has 2–6, most preferably 3–5 pairs of locking devices. In each lock of the series forming part, there is a hole for fastening the device to the bottom surface of which is at an angle in the longitudinal direction of the lock in relation to the base of the lock to be set against wall. The thickness of the lock tongue lying in the holes varies, the interval of variation being 2–5 mm, most preferably 2.5–4.5 mm, on the bottom surface of the hole.

Each of the locks forming part of the series is made from the same material as the fastening device. In the locking device there is a slot for attaching the locking device to the protrusion. At the end of the axle pin belonging to the housing there is a groove around the entire circumference of the axle pin for attaching the locking device. The depth of the groove is parallel to the radius of the axle pin and corresponds essentially to the dimensions of the locking device.

The locking device is intended to be set in the groove at essentially right angles to the axle pin by pressing it. The fastening adapter includes a jig for drilling holes in the aforesaid wall. The two drilling holes in the jig are set at the same distance from one another as the axle pin is from the protrusion. The first hole in the jig corresponds to the diameter of the protrusion and the second hole in the jig corresponds to the diameter of the axle pin. There is a measuring stick at the end of the jig with the first hole for positioning the jig in relation to the lower edge of the wall.

The fastening devices of a fastening adapter according to the invention are formed by the structural components of the fastening adapter. Thus separate fasteners, made form metal for example, are not required. In addition, the fastening adapter can be installed without tools, after holes have been drilled. The parts of the fastening adapter remaining inside the helmet are short and do not have detrimental protrusions. In addition, the locking device of the fastening member acts against a large surface area of the wall of the helmet. Further, the fastening adapter can be used to attach hearing protectors or a protection visor, or both simultaneously. The fastening adapter according to the invention can also be fitted in connection with a headband or any other construction supported by the head.

These and other features and advantages of the invention are described in greater detail in the following detailed description with reference to the accompanying drawings showing some embodiments of the invention.

DETAILED DESCRIPTION OF THE INVENTION

Figure 1:
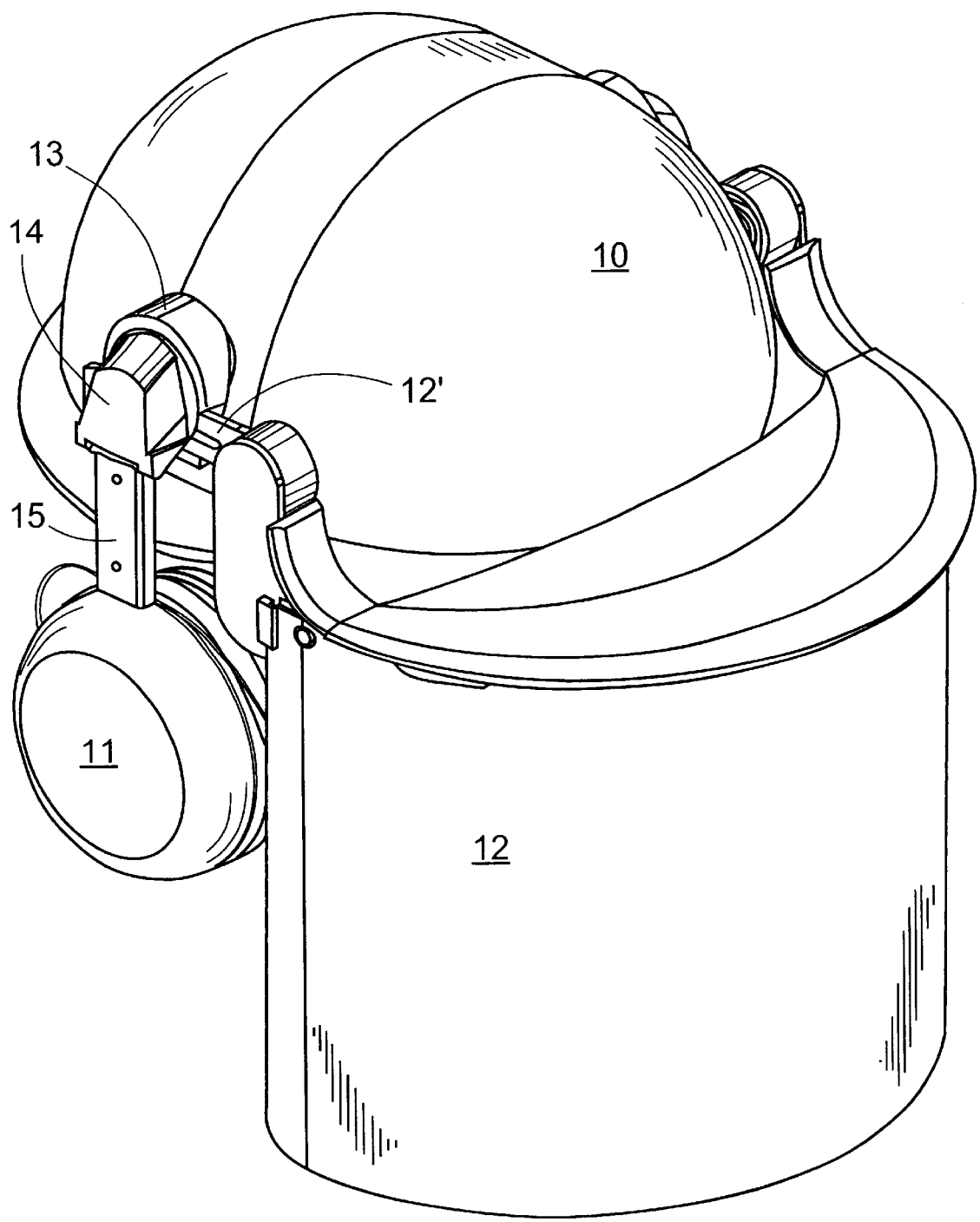
FIG. 1 shows a fastening adapter fastened to the helmet, fastening both a hearing protector and a visor.

In the following description, the fastening adapter according to the invention is described as applied to a helmet. Besides a helmet, any other construction, and its wall, supported by the head can also be used. FIG. 1 shows a general-purpose helmet 10, to which hearing protectors 11 and a visor 12 protecting the user's face are attached by means of a fastening adapter according to the invention. There are no pre-installed attachment holes or attachments in helmet 10. On the other hand, it is possible to use the fastening adapter, even if there were previous attachments in the helmet. Naturally one fastening adapter is placed on either side of the helmet. From now on, the fastening adapter will be referred to more simply as the adapter. The principal components in the adapter are the body part 13, the housing 14, with an arm 15 corresponding to the product to be fastened in it, and a lock 17 to be installed inside the helmet 10. A support arm 12' for a visor 12 can also be attached using the adapter, whether or not hearing protectors 11 are installed.

Figure 2A:
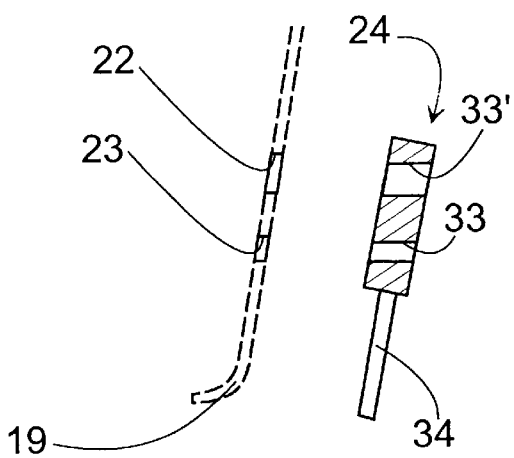
FIGS. 2a–2f show the stages of the fastening adapter being attached to the side of the helmet.
Figure 2B:
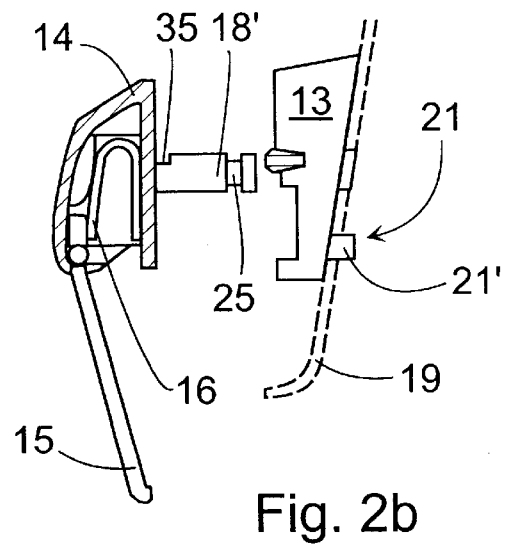
Figure 2C:
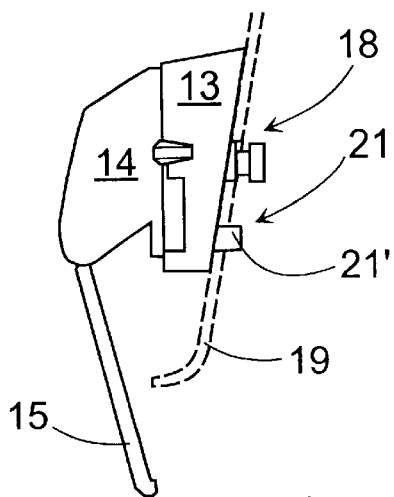
Figure 2D:
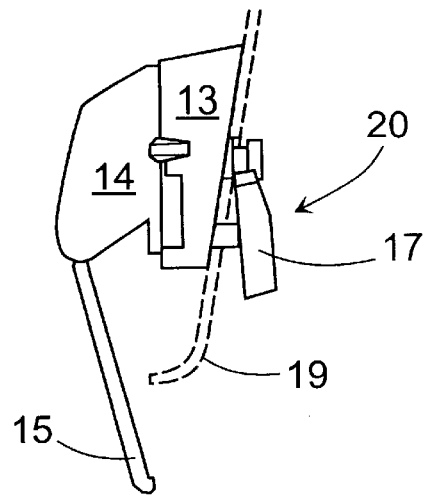
Figure 2E:
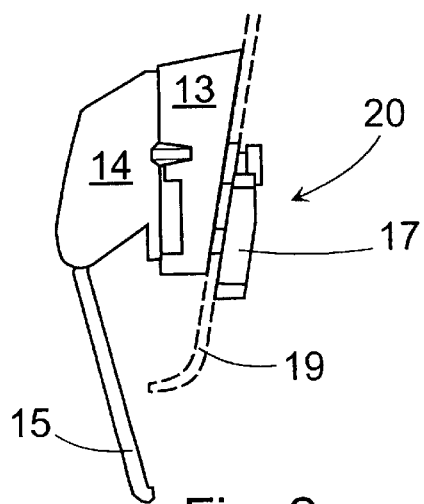
Figure 2F:
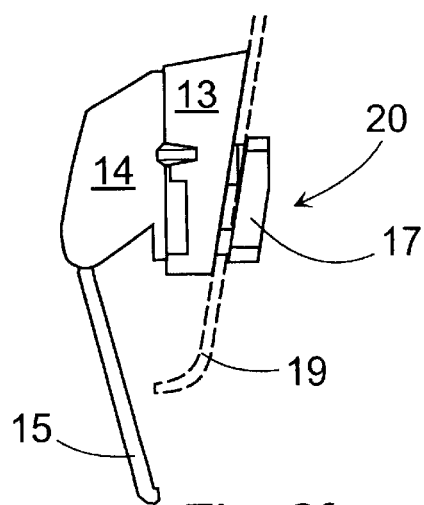

FIGS. 2a–2f show the stages in the installation of the adapter. First, two holes 22 and 23 are drilled in the wall 19, at a set distance from the lower edge (FIG. 2a). It is preferable to use a jig 24, which is supplied with the adapter, when drilling. Next, body part 13 is placed against wall 19, so that its protrusion 21' lies in the lower hole 23 (FIG. 23b). Protrusion 21' prevents body part 13 from rotating, when housing 14 is turned. At the same time, the prepared housing 14 is pushed through body part 13 against body part 13. The second hole 22 drilled through wall 19 coincides with hole 13', into which hole 22 axle pin 18' of housing 14 is also pushed, to protrude from the opposite side of wall 19 (FIG. 2c). After this, lock 17 can be installed in groove 25 in axle pin 18' and the slot 26 in lock 17 is set in protrusion 21'. Finally, lock 17 is turned against wall 19 and pressed into groove 25, when the fastening is completed (FIGS. 2d–2f). Housing 14 also includes spring 16 and arm 15.

Fastening member 18 of the adapter according to the invention is thus in two parts, the fastening devices of both of which are pins extending through the wall. Thus, the pins are also located a distance apart. In addition, the first fastening device comprises protrusion 21' of body part 13. Thus protrusion 21' is preferably a pin, which extends through wall 19 to prevent body part 13 from rotating. The other fastening device comprises axle pin 18' of housing 14, which extends through both body part 13 and wall 19 (FIGS. 2c–2f). In addition, locking device 20 is fitted directly to axle pin 18'.

The adapter also includes a series of pairs of locking devices forming locks 17 for different wall thicknesses. In addition, there is a recess 27 in lock 17 for axle pin 18'. The lock suiting the case in question is selected from the pre-made locks, so that the thickness of its lock tongue/tip 28 corresponds to the thickness of the wall of the helmet or similar, together with the protrusion of axle pin 18'. Thus a suitable lock can always be found for different wall thicknesses and the fastening adapter can be installed in an arbitrary helmet.

Figure 5:
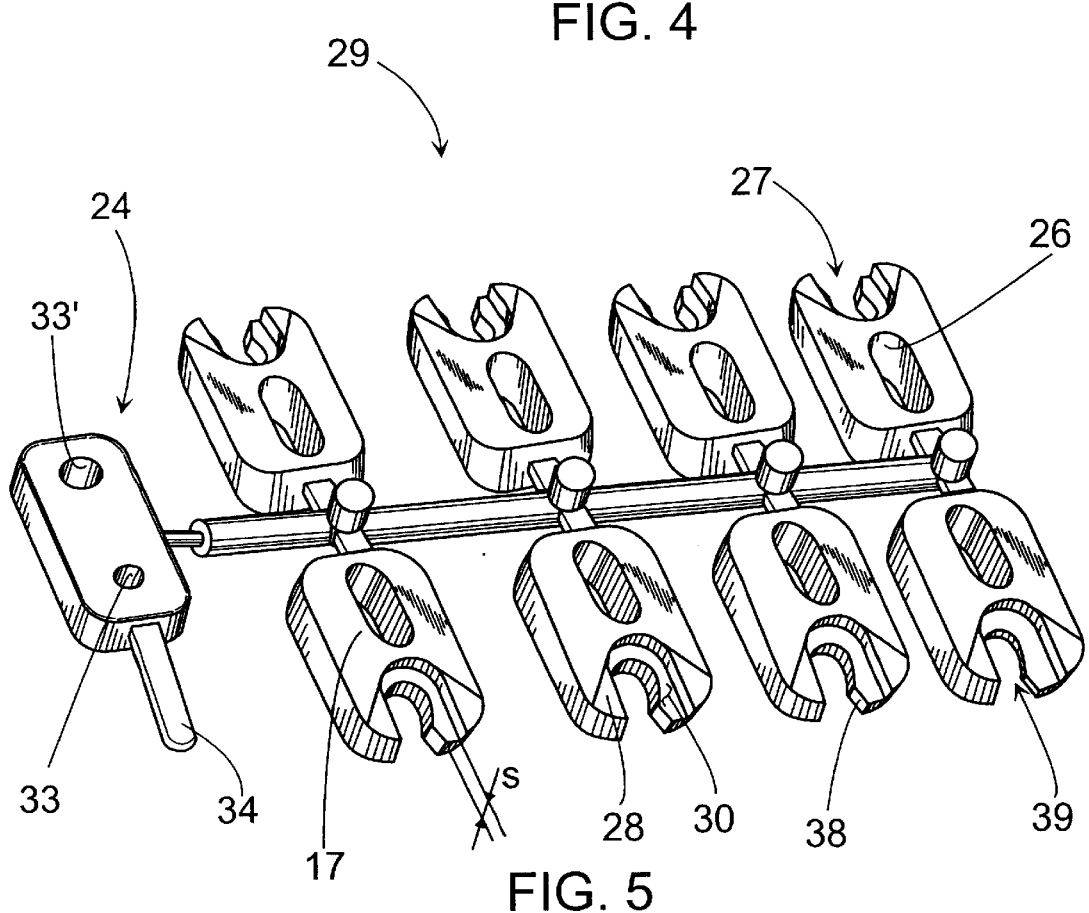
FIG. 5 shows the series formed by the locks used in the fastening adapter.

FIG. 5 shows details of a comb 29 of locks of different thicknesses. Generally, the lock is made of the same material as the axle pin, which reduces wear in these parts. Usually the series comprises 2–6, more preferably 3–5 pairs of locking devices. The comb 29 of locks according to FIG. 5 has locks 17 of four different thicknesses, with a varying dimension S of the lock tongue 28. In this embodiment, the range of variation at the base of recess 27 is 2.8–4.4 mm, divided into four alternative thicknesses. Generally the range of variation of thickness of the lock tongue is 2–5 mm on the bottom surface of the recess 27, most preferably 2.5–4.5 mm. These alternatives are sufficient, as the combined flexibility of the body part, wall, axle pin, and lock allows for all the intermediate sizes. In addition, bottom surface 30 of recess 27 is angled, to compensate for the angle position of lock 17 in relation to axle pin 18' in the locking position (see FIGS. 2c–2e).

Figure 3:
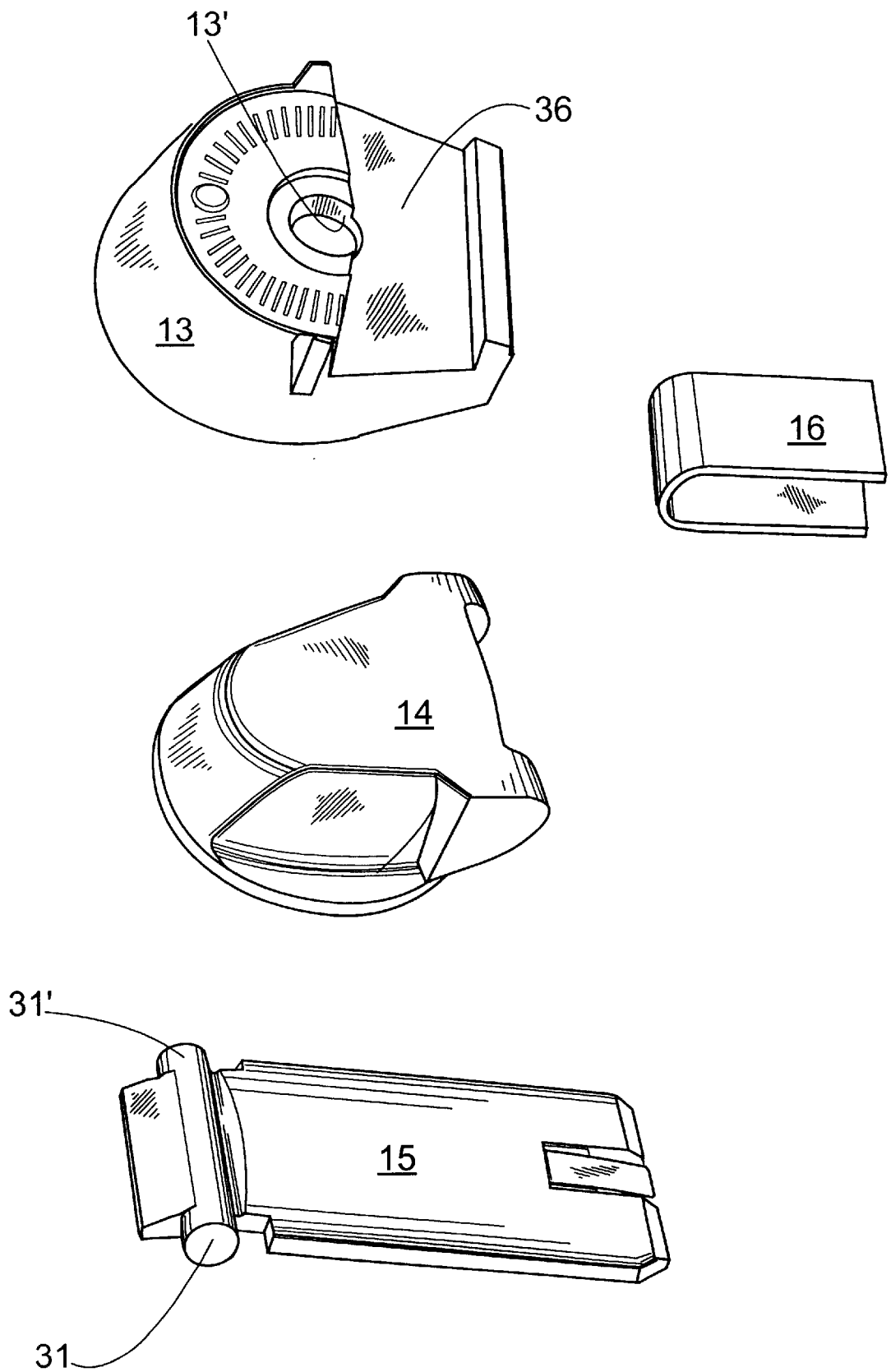
FIG. 3 shows the parts of the fastening adapter, without the lock.
Figure 4:
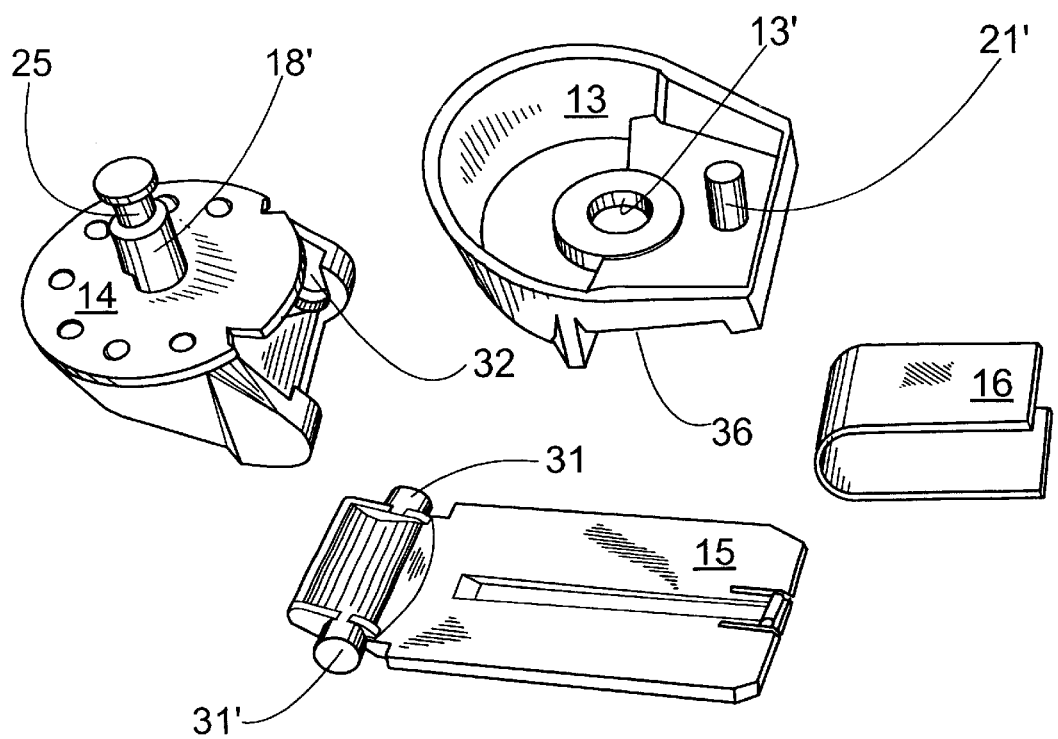
FIG. 4 shows the parts of FIG. 3 seen from the other side.

FIGS. 3 and 4 show the parts of the adapter except for the lock. In FIGS. 3 and 4 the body part 13, the housing 14, the arm 15, and the spring 16 are shown in detail. In housing 14 there is an axle pin 18', which acts as a rotation axis. In body part 13 there is also a pin forming the aforementioned protrusion 21', which prevents the body part 13 from rotating in relation to the side. At the upper end of arm 15 there are pins 31 and 31', which correspond to the spaces 32 in housing 14. U-shaped spring 16 presses against the upper end of arm 15, which creates a force that presses hearing protectors 11 against the head of the user.

According to FIG. 4, there is a groove 25 at the end of axle pin 18' to secure locking device 20, and which runs round the entire circumference of axle pin 18'. The depth of groove 25 is parallel to the radius of axle pin 18' and corresponds essentially to the dimensions of locking device 20. In practice, locking device 20 is dimensioned so that when pressed it settles in groove 25 at essentially right angles to axle pin 18'. The shape of recess 27 of lock 17 can be seen particularly in FIG. 5. Bevels 38 of recess 27 center lock 17 in relation to axle pin 18' and, after a tight gap 39, recess 27 again widens to permit axle pin 18' to rotate freely. Though lock 17 can also be detached from axle pin 18', it will not detach itself during use.

FIG. 5 further shows also the jig 24 belonging to the adapter, in which there are drill holes 33 and 33'. The drill holes 33 and 33' in jig 24 are set at the distance between axle pin 18' and protrusion 21'. The diameter of the first hole 33 in jig 24 corresponds to that of protrusion 21' and the diameter of the second hole 33' to that of axle pin 18'. Thus drill holes 33 and 33' are the right sizes and at the right distance apart. In addition, there is a measure stick 34 at the end of jig 24 with hole 33, for positioning jig 24 in relation to the lower edge of the side. This makes it easy to use jig 24 to position and drill holes 22 and 23.

FIG. 2b also shows a slot 35 in axle pin 18', by means of which the support arm 12' of visor 12 is allowed to be pushed in when housing 14 is turned upside down (not show). After this, when the housing is once again turned downwards, the visor support arm is locked in place. Correspondingly, FIG. 3 also shows recess 36 in body part 13, into which the visor support arm can be pushed. The support arm is locked into this recess with the aid of the housing, when the complete part of the axle rotates into the recess in its upper edge (not shown). The visor can then be rapidly fitted and removed, without tools.

Figure 6:
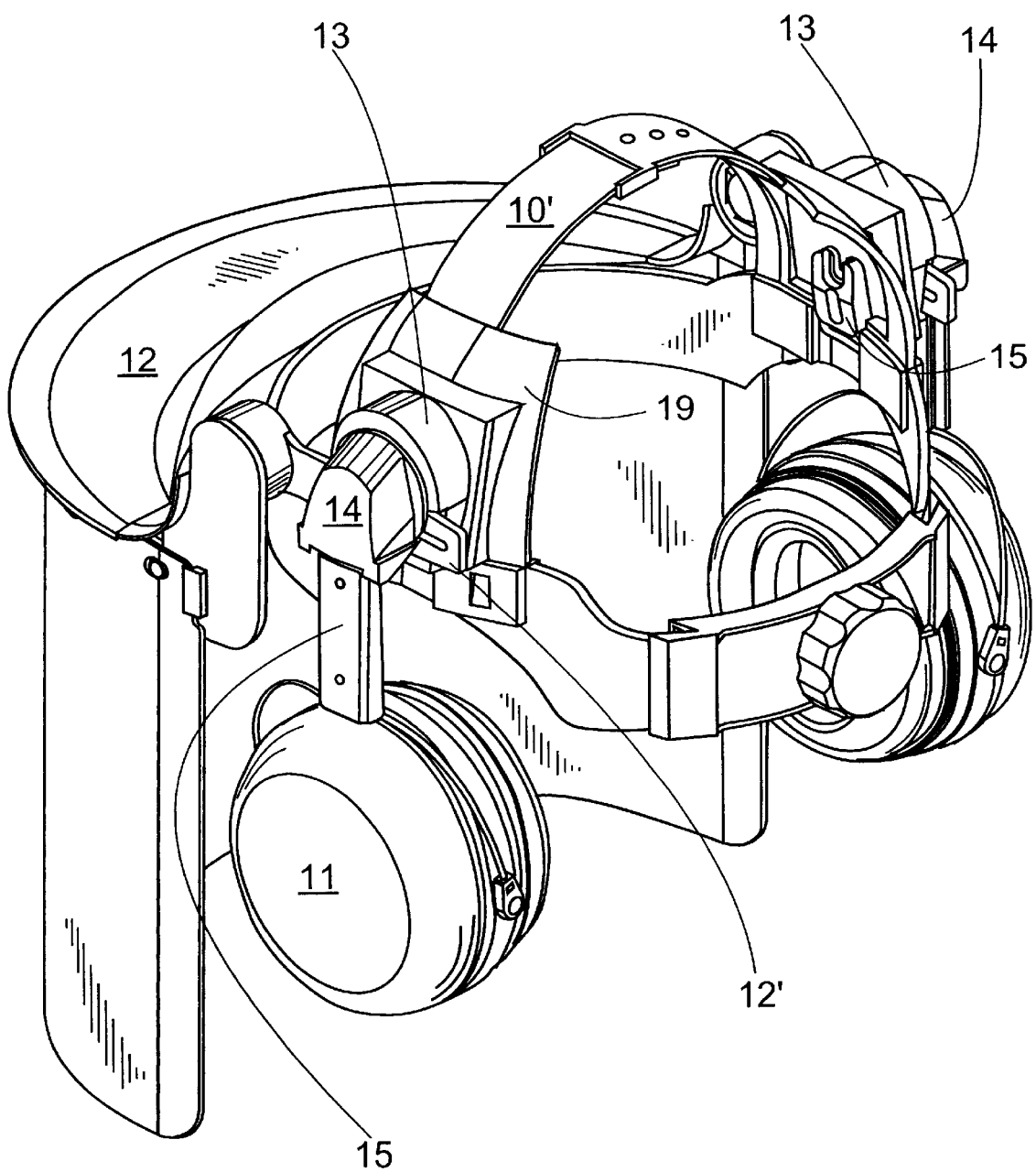
FIG. 6 shows a variation of the fastening adapter in FIG. 1 in a headband.

The fastening adapter according to the invention is quite versatile, being suitable for all models of helmet. After the holes have been drilled, the fastening adapter can be fitted and, if desired, removed, without tools. It can also be fitted to headbands 10' according to FIG. 6. In the case of headbands, the installation of the fastening adapter corresponds to the manner of installation in a helmet, as described above.

Figure 7:
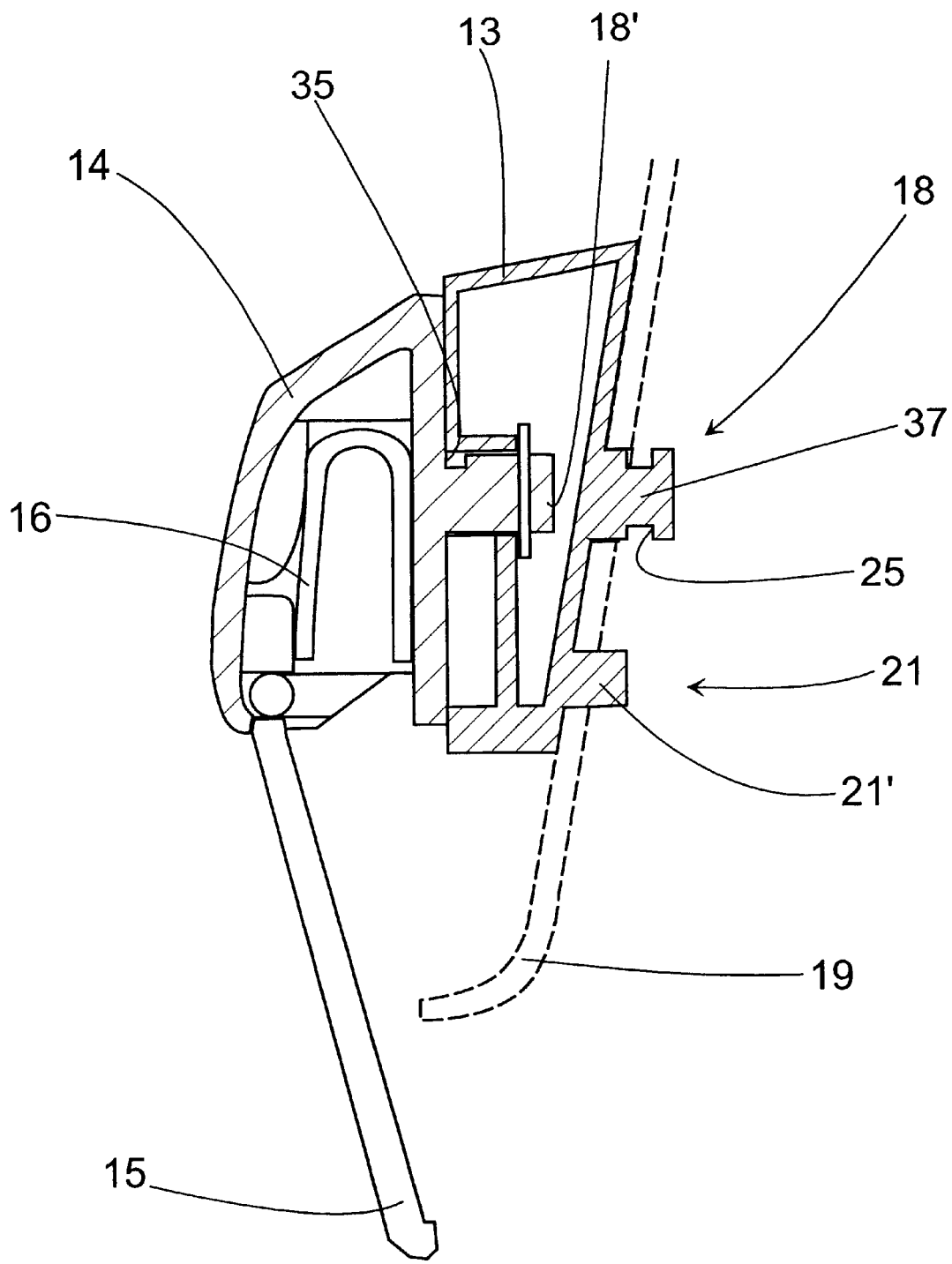
FIG. 7 shows another embodiment of the fastening adapter according to the invention, in cross-section.

One fastening adapter according to the invention is disclosed above. FIG. 7 shows a variation of the fastening adapter. In this, axle pin 18' of housing 14 does not extend through wall 19, instead it attached rotatably to body part 13. In body part 13, there is then another pin 37, to which lock 17 used as a locking device 20 is fitted (not shown). The second pin 37 can also be set on another axis than axle pin 18'. The same reference numbers are used for components that are operationally similar.

Although the invention has been described by reference to a specific embodiment, it should be understood that numerous changes may be made within the spirit and scope of the inventive concepts described. Accordingly, it is intended that the invention not be limited to the described embodiment, but that it have the full scope defined by the language of the following claims.

What is claimed is:

1. A fastening adapter for fastening protectors, such as hearing and face protectors, to headgear having a wall portion, said fastening adapter comprising:

a body part including a protrusion defining a first fastening device, said protrusion adapted to be fit table through such headgear wall;

a housing including an axle pin defining a second fastening device rotatably connected to the body part and adapted to support the protector, said axle pin adapted to extend through both said body part and headgear wall; and a locking device mountable on the opposite side of the aforesaid wall in relation to the body part for locking the fastening device and for pressing the body part onto the wall.

2. A fastening adapter according to claim 1, which includes a series of pairs of locking devices providing locks for different headgear wall thicknesses.

3. A fastening device according to claim 2, wherein the series includes 2–6 pairs of locking devices.

4. A fastening adapter according to claim 2, wherein each lock of the series includes a recess for receiving the fastening device, an opening of the recess being at an angle in a longitudinal direction of the lock.

5. A fastening adapter according to claim 4, wherein the recess defines in part lock tongues, having thicknesses that varies, the interval of variation being 2–5 mm.

6. A fastening adapter according to claim 2, in which each of the locks forming part of the series is made from the same material as the fastening device.

7. A fastening adapter according to claim 1 wherein said locking device includes a slot for attaching the locking device to said protrusion.

8. A fastening adapter according to claim 1 wherein said axle pin includes a groove around the entire circumference of the axle pin for attaching the locking device.

9. A fastening adapter according to claim 8, in which the depth of the groove is parallel to the radius of the axle pin and which corresponds essentially to the dimensions of the locking device.

10. A fastening adapter according to claim 9, in which the locking device is intended to be set in the groove at essentially right angles to the axle pin, by pressing it.

11. A fastening adapter according to claim 8, in which the locking device is intended to be set in the groove at essentially right angles to the axle pin, by pressing it.

12. A fastening adapter according to claim 1, which includes a jig for drilling holes in the aforesaid wall.

13. A fastening adapter according to claim 12, in which the two drilling holes in the jig are set at the same distance from one another as the axle pin is from the protrusion.

14. A fastening adapter according to claim 13, in which the first hole of the jig corresponds to the diameter of the protrusion and the second hole in the jig corresponds to the diameter of the axle pin.

15. A fastening adapter according to claim 14, in which there is a measuring stick at the end of the jig with the first hole for positioning the jig in relation to the lower edge of the wall.

* * * * *